United States Patent
Wu et al.

(10) Patent No.: US 10,997,700 B2
(45) Date of Patent: May 4, 2021

(54) SYSTEM AND METHOD FOR NORMALIZING SKIN TONE BRIGHTNESS IN A PORTRAIT IMAGE

(71) Applicant: Idemia Identity & Security USA LLC, Billerica, MA (US)

(72) Inventors: Yecheng Wu, Lexington, MA (US); Brian K. Martin, McMurray, PA (US)

(73) Assignee: Idemia Identity & Security USA LLC, Billerica, MA (US)

( * ) Notice: Subject to any disclaimer, the term of this patent is extended or adjusted under 35 U.S.C. 154(b) by 30 days.

(21) Appl. No.: 16/236,931

(22) Filed: Dec. 31, 2018

(65) Prior Publication Data

US 2019/0206033 A1    Jul. 4, 2019

Related U.S. Application Data

(60) Provisional application No. 62/612,246, filed on Dec. 29, 2017.

(51) Int. Cl.
*G06K 9/00* (2006.01)
*G06T 5/00* (2006.01)
*G06K 9/62* (2006.01)

(52) U.S. Cl.
CPC .......... *G06T 5/009* (2013.01); *G06K 9/00228* (2013.01); *G06K 9/00362* (2013.01);
(Continued)

(58) Field of Classification Search
CPC .......... G06T 5/009; G06T 5/008; G06T 5/00; G06T 5/001; G06T 5/20; G06T 7/90;
(Continued)

(56) References Cited

U.S. PATENT DOCUMENTS 8,194,978 B2    6/2012    Ozdemir et al.
9,070,192 B1    6/2015    Smith
(Continued)

FOREIGN PATENT DOCUMENTS

EP    1049045    11/2000

OTHER PUBLICATIONS

PCT International Search Report and Written Opinion in International Application No. PCT/US18/68204, dated Apr. 9, 2019, 19 pages.

*Primary Examiner* — Jose L Couso
(74) *Attorney, Agent, or Firm* — Fish & Richardson P.C.

(57) ABSTRACT

Methods, systems, and apparatus, including computer programs encoded on a computer storage medium, for normalizing skin tone brightness are disclosed. In one aspect, a method includes the actions of receiving a color image that includes a representation of a face. The actions further include selecting a group of pixels in the color image that includes the representation of the face. The actions further include determining a brightness value that represents a brightness of the group of pixels in the color image that includes the representation of the face. The actions further include determining a brightness difference value. The actions further include comparing the brightness difference value to an upper threshold brightness difference value and a lower threshold brightness difference value. The actions further include determining whether to adjust a brightness of the color image that includes the representation of the face.

20 Claims, 4 Drawing Sheets

(52) U.S. Cl.
CPC .. *G06K 9/6212* (2013.01); *G06T 2207/10024* (2013.01); *G06T 2207/20208* (2013.01); *G06T 2207/30201* (2013.01)

(58) Field of Classification Search
CPC ... G06T 7/00; G06T 7/136; G06T 7/11; G06T 11/001; G06T 11/60; G06T 2207/10024; G06T 2207/20208; G06T 2207/30201; G06T 2207/10004; G06K 9/00362; G06K 9/00228; G06K 9/6212; G06K 9/00234; G06K 9/00268; G06K 9/00248; G06K 9/00221; G06K 9/00275; G06K 9/00281; G06K 9/036; G06K 9/4652; G06K 9/52; H04N 1/628; H04N 1/60; H04N 1/6027; H04N 1/00289; H04N 1/32309; H04N 5/23219; H04N 5/2351; H04N 5/232; H04N 5/23229; H04N 9/643; H04N 21/4854; H04N 2201/3233; H04N 2201/3271; H04N 2201/3236; H04N 2201/3204; G09G 2320/0626; G09G 2320/0233; G09G 2320/066; G09G 2320/0666; G09G 2340/06; G09G 3/2003; G09G 3/3607; G09G 5/02; G09G 5/06; G09G 5/10; B42D 15/00; B42D 25/29; B42D 25/309; B42D 25/00; B42D 25/23; B42D 25/42; B42D 25/305; B42D 2035/06; B42D 2035/24; G07C 2209/41; B41M 3/14; B41M 3/008; G03C 5/08
See application file for complete search history.

(56) References Cited

U.S. PATENT DOCUMENTS 9,336,571 B2 5/2016 Wu et al.
2004/0218832 A1 11/2004 Luo et al.
2005/0024538 A1 2/2005 Park et al.
2005/0068420 A1 3/2005 Duggan et al.
2007/0070214 A1* 3/2007 Nakamura .............. G06T 5/009
    348/222.1
2008/0100721 A1* 5/2008 Ayaki ................ H04N 5/23219
    348/222.1
2009/0041347 A1* 2/2009 Iguchi .................... H04N 1/628
    382/167
2009/0116043 A1* 5/2009 Nakajima ............. H04N 1/407
    358/1.9
2010/0027072 A1* 2/2010 Enjuji ....................... G06T 5/40
    358/3.01
2010/0271507 A1 10/2010 Hung et al.
2011/0164828 A1* 7/2011 Iwata ...................... G06T 5/40
    382/274
2011/0317917 A1 12/2011 Free
2012/0008008 A1* 1/2012 Nakabayashi ..... H04N 5/23219
    348/223.1
2012/0162478 A1* 6/2012 Lee .................... H04N 5/23229
    348/234
2013/0004070 A1 1/2013 Zeng et al.
2013/0175793 A1 7/2013 Mercier
2013/0208981 A1 8/2013 Kong
2014/0334728 A1 11/2014 Wu et al.
2015/0022567 A1 1/2015 Sullivan et al.
2015/0063656 A1 3/2015 Poder et al.
2015/0117771 A1* 4/2015 Sasaki ..................... G06T 5/007
    382/164
2015/0302564 A1 10/2015 Ho et al.
2016/0050363 A1 2/2016 Stubler et al.
2016/0239991 A1 8/2016 Martin et al.
2017/0372108 A1 12/2017 Corcoran et al.
2018/0139359 A1* 5/2018 Lesellier ............... H04N 1/6005
2018/0341804 A1* 11/2018 Takayama ......... G06K 9/00234
2019/0188454 A1* 6/2019 Yuan .................... G06K 9/2027
2020/0020152 A1* 1/2020 Nakada ............. G06K 9/00255

* cited by examiner

SYSTEM AND METHOD FOR NORMALIZING SKIN TONE BRIGHTNESS IN A PORTRAIT IMAGE

CROSS-REFERENCE TO RELATED APPLICATION

This application claims the benefit of U.S. Application No. 62/612,246, filed Dec. 29, 2017, the contents of which are incorporated by reference.

TECHNICAL FIELD

This document generally relates to improving the image quality of portrait images primed for printing on identification documents.

BACKGROUND

Identity documents are widely used to support an identity assertion.

SUMMARY

Portrait images are often presented on identification documents to provide a read-to-use proof for supporting an identity assertion. To present the portrait image of a subject on an identification document, the portrait image of the subject is generally printed on the identification document, such as a passport, a driver's license, or an ID card. In this context, extremely dark or bright skin tone brightness in a portrait image, even limited to a relatively small region of the portrait, could generate poorly printed identification documents. This result is due to the limited dynamic range of printing devices. These printing devices could experience saturation or misalignment of color scales when dealing with portrait images with extremely dark or bright skin tones. The disclosure provides methods and systems to automatically normalize skin brightness in a captured portrait image to improve the print quality on identification documents that individuals may use to prove an identity assertion.

According to an innovative aspect of the subject matter described in this application, a method for normalizing skin tone brightness includes the actions of receiving, by a computing device, a color image that includes a representation of a face; selecting, by the computing device, a group of pixels in the color image that includes the representation of the face; determining, by the computing device, a brightness value that represents a brightness of the group of pixels in the color image that includes the representation of the face; based on the brightness value and a predefined brightness value, determining, by the computing device, a brightness difference value; comparing, by the computing device, the brightness difference value to an upper threshold brightness difference value and a lower threshold brightness difference value; and based on comparing the brightness difference value to the upper threshold brightness difference value and the lower threshold brightness difference value, determining, by the computing device, whether to adjust a brightness of the color image that includes the representation of the face.

These and other implementations can each optionally include one or more of the following features. Each pixel of the color image is defined by a hue quantity, a saturation quantity, and a value quantity. The actions further include determining a brightness value the represents a brightness of the group of pixels in the color image that includes the representation of the face by determining an average of the value quantities for pixels in the group of pixels. The actions further include, based on comparing the brightness difference value to the upper threshold brightness difference value and the lower threshold brightness difference value, determining, by the computing device, that the brightness difference value is greater than the upper threshold brightness difference value; and determining whether to adjust a brightness of the color image that includes the representation of the face by determining to decrease the brightness of the color image that includes the representation of the face.

The actions further include decreasing the brightness of the color image that includes the representation of the face by subtracting a predetermined value from the value quantity of each pixel of the color image that includes the representation of the face. The actions further include decreasing the brightness of the color image that includes the representation of the face by subtracting a value from the value quantity of each pixel of the color image that includes the representation of the face based on the brightness difference value. The actions further include, based on comparing the brightness difference value to the upper threshold brightness difference value and the lower threshold brightness difference value, determining, by the computing device, that the brightness difference value is less than the lower threshold brightness difference value; and determining whether to adjust a brightness of the color image that includes the representation of the face by determining to increase the brightness of the color image that includes the representation of the face.

The actions further include decreasing the brightness of the color image that includes the representation of the face by adding a predetermined value to the value quantity of each pixel of the color image that includes the representation of the face. The actions further include decreasing the brightness of the color image that includes the representation of the face by adding a value to the value quantity of each pixel of the color image that includes the representation of the face based on the brightness difference value. The actions further include, based on comparing the brightness difference value to the upper threshold brightness difference value and the lower threshold brightness difference value, determining, by the computing device, that the brightness difference value is between the upper threshold brightness difference value and the lower threshold brightness difference value; and determining whether to adjust a brightness of the color image that includes the representation of the face by maintaining the brightness of the color image that includes the representation of the face. The predefined brightness value is based on a type of device to which the computing device provides the adjusted color image.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A system may capture an image of a user for use in an identification document using different types of camera that capture the image at different brightness levels. The system is able to normalize the brightness levels to ensure an accurate portrait on the identification document.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
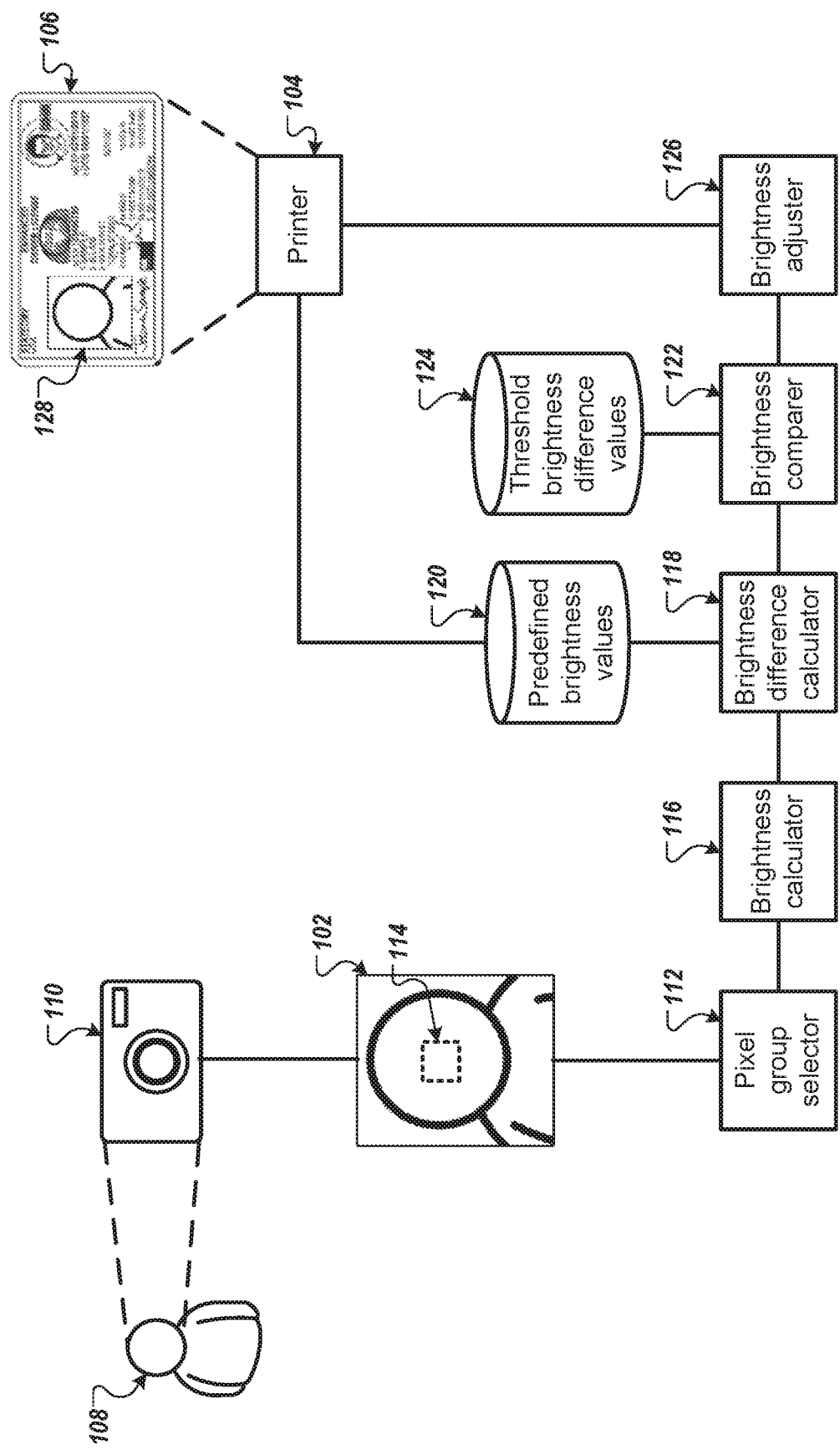
FIG. 1 illustrates an example system for normalizing skin tone of a portrait image.

FIG. 1 illustrates an example system 100 for normalizing skin tone or a portrait image. Briefly, and as described in more detail below, the system 100 normalizes the skin tone of the subject of image 102. The skin tone of the subject of image 102 may be too bright or not bright enough to ensure that an identification document 106 printed by the printer 104 is of sufficient quality and accurately represents the subject of the image 102.

In more detail, the user 108 may use a camera 110 to capture a portrait image 102. The user 108 may be attempting to capture an portrait to renew a driver's license, passport, or other type of identification document 106. In some implementations, the camera 110 may be included on a mobile device such as a mobile phone. In some implementations, the camera may be located in a government office that the user 108 visited to receive or renew the identification document 106.

In some implementations, the camera 110 is configured to generate the image 102 with pixels that each include a hue quantity, a saturation quantity, and a value quantity. The hue quantity and the saturation quantity may be related to the color of the pixel. The value quantity may be related to the brightness of the pixel. The camera 110 generating the image with pixels that each include a hue quantity, a saturation quantity, and a value quantity may be in contrast to pixels defined by other quantities such as a red quantity, a green quantity, and a blue quantity. Instead of defining pixels using a hue quantity, a saturation quantity, and a value quantity, the camera 110 may use any other color space that includes a component for pixel luminance or brightness.

The camera 110 provides the portrait image 102 to the pixel group selector 112. The pixel group selector 112 is configured to select a group 114 of pixels of the image 102. In some implementations, the group 114 of pixels may be a fixed quantity such as a fifty by fifty area of pixels. In some implementations, the group 114 of pixels may be a fixed proportion of the pixels, such as ten percent of the pixels of the image 102. In some implementations, the pixel group selector 112 may perform facial detection on the image 102 and select a group of pixels that is included in the detected face.

The brightness calculator 116 calculates the brightness of the group of pixels 114. In some implementations, the brightness calculator 116 calculates an arithmetic mean of the value quantities of the pixels in the group of pixels 114. In some implementations, the brightness calculator 116 calculates a geometric mean of the value quantities of the pixels in the group of pixels 114. In some implementations, the brightness calculator 116 calculates the median of the value quantities of the pixels in the group of pixels 114.

The brightness difference calculator 118 calculates the brightness difference using the brightness of the group of pixels 114 and a predefined brightness value accessed from the predefined brightness values 120. The predefined brightness values 120 may include different predefined brightness values depending on the use of the image 102. For example, the predefined brightness values 120 includes a particular predefined brightness value if the image 102 will be used on an identification document 106 printed using the printer 104. The predefined brightness values 120 may include additional predefined brightness value for other printers. The predefined brightness values 120 may also include a predefined brightness value if the image 102 is to be used in a mobile identification document.

The brightness difference calculator 118 access the predefined brightness value and determines a brightness difference between the predefined brightness value and the brightness of the group of pixels 114. The brightness difference calculator 118 may subtract the predefined brightness value from the brightness of the group of pixels 114 to generate the brightness difference. In some implementations, the brightness difference calculator 118 may calculate a ratio or quotient of the predefined brightness value and the brightness of the group of pixels 114 to generate the brightness difference. In some implementations, brightness difference may be the inverse of the ratio or quotient.

The brightness difference calculator 118 provides the brightness difference to the brightness comparer 122. The brightness comparer 122 access the threshold brightness difference from the threshold brightness difference values 124. The threshold brightness difference includes an upper threshold and a lower threshold. The brightness comparer 122 compares the brightness difference to the upper threshold and the lower threshold. If the brightness difference is between the upper threshold and the lower threshold, then the brightness comparer 122 bypasses the brightness adjuster 126 and provides the image 102 to the printer 104. In this instance, the skin tone of the subject of the image 102 does not need adjusting.

If the brightness difference is above the upper threshold, then the brightness of the image 102 may be too high. In this instance, the brightness comparer 122 provides the image 102 to the brightness adjuster 126 and an instruction to decrease the brightness of the image 102.

If the brightness difference is below the upper threshold, then the brightness of the image 102 may be too low. In this instance, the brightness comparer 122 provides the image 102 to the brightness adjuster 126 and an instruction to increase the brightness of the image 102.

In some implementations, the brightness adjuster 126 is configured to adjust the brightness of the image 102 by a predetermined amount. For example, if the brightness adjuster 126 receives an instruction to brighten the image 102, then the brightness adjuster 126 may increase the value quantity of each pixel by a fixed amount. If the brightness adjuster 126 receives an instruction to decrease the brightness of the image 102, then the brightness adjuster 126 may decrease the value quantity of each pixel by a fixed amount.

In some implementations, the brightness adjuster 126 is configured to adjust the brightness of the image 102 by a variable amount. For example, if the brightness adjuster 126 receives an instruction to brighten the image 102 and receives the brightness difference, then the brightness adjuster 126 may use the brightness difference to calculate an amount to increase the value quantity of each pixel. If the brightness adjuster 126 receives an instruction to decrease the brightness of the image 102 and receives the brightness difference, then the brightness adjuster 126 may use the brightness difference to calculate an amount to decrease the value quantity of each pixel. The amount that the brightness adjuster 126 adjusts the value quantity of each pixel may be a fixed percentage of the brightness difference.

The brightness adjuster 126 provides the adjusted image 128 to the printer 104. The printer 104 prints the identification document with the adjusted image 128. In some implementations, the brightness adjuster 126 provides the adjusted image 128 to a different device for a different use. For example, the brightness adjuster 126 may provide the adjusted image 128 to a device for use on a mobile identification document.

In some implementations, the brightness adjuster 126 may provide the adjusted image 128 to the pixel group selector 112 for further analysis to ensure the brightness adjuster 126 adjusted the brightness of the pixels correctly.

In some implementations, the brightness adjuster 126 may perform facial detection on the image 102 and adjust the brightness of only those pixels that are part of the facial region.

Figure 2:
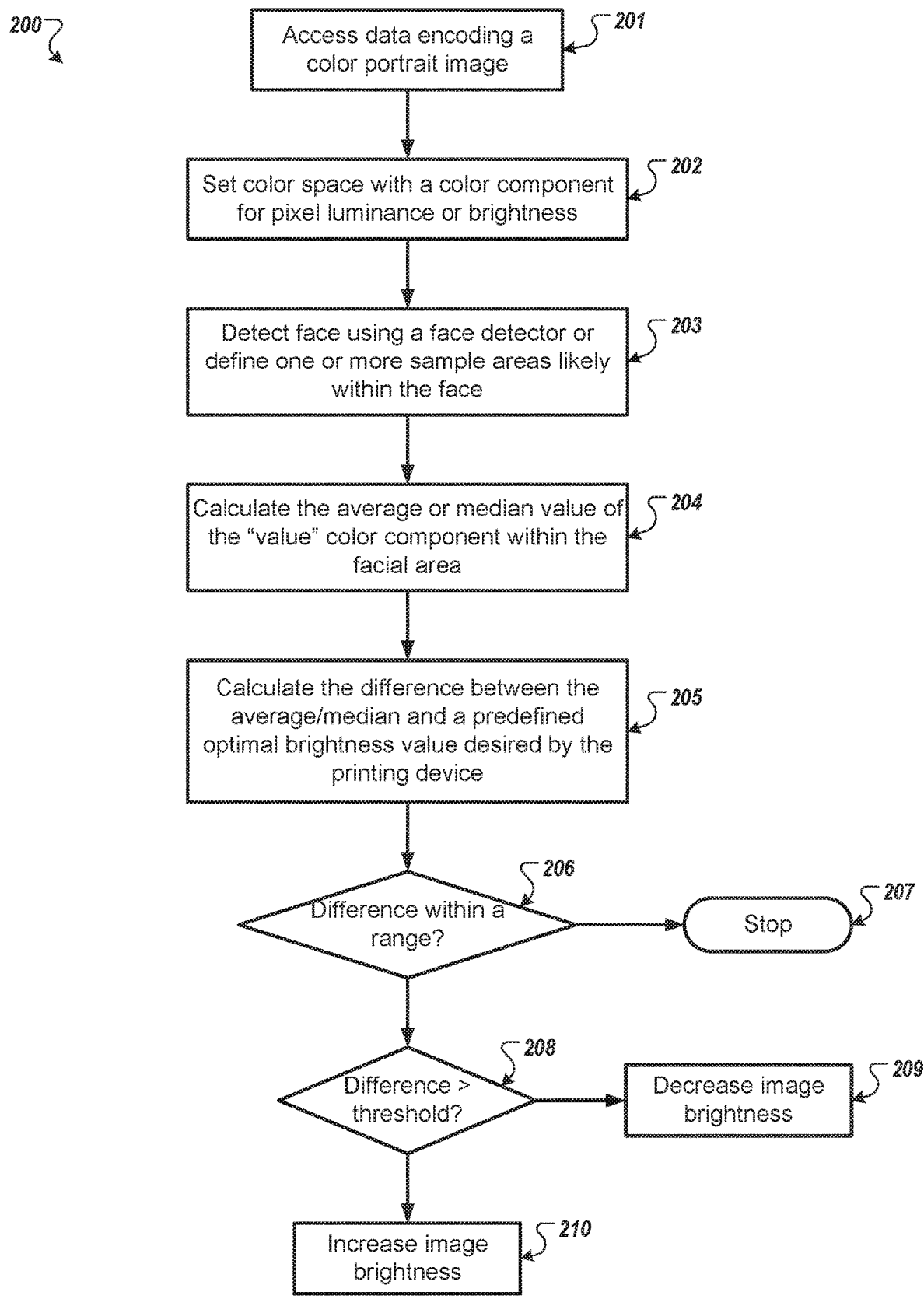
FIG. 2 shows an example of a flow chart for automatically normalizing skin tone brightness in portrait images for presentation on identification documents.

Referring to FIG. 2 that shows an example of flowchart 200, some implementations may initially access data encoding color portrait images (201). The color portrait images may be stored at local storage where the physical identification document is scheduled for printing (before issuance). In some instances, the storage may leverage cloud service so that the actual data information is obtained through a web service remotely. For a color portrait image, the flow chart 200 proceeds to set the color space with a color component for pixel luminance or brightness (202). In some instances, the color space are set to HSV (hue, saturation and value for brightness). In other instances, other color spaces (for example, copper, hot, or cool) can be used.

Next, a processor in some implementations proceeds to detect face using a face detector or define one or more sample areas in the portrait image likely within the face (203). For example, a rectangle can be imposed in the center of the portrait image. In this example, the size can be a fixed size, for example (150×150 pixels). The size may also be measured in relative terms, such as, for example, such as 30% of the image width and height.

Thereafter, the processor calculates the average or median value of the "value" color component of all pixels within the sample area for face (204). Here, the "value" color component refers to, for example, the brightness or luminance of color pixels rather than the chrominance or coloration.

The processor in some implementations may then calculate the difference between the average face brightness value from the same area and a predefined optimal brightness value desired by the printing device (205). This comparison may determine the general suitability of the portrait image for printing purposes.

If the difference is within a range (206), then implementations may stop (207). Otherwise, the implementations may proceed further to determine the manner in which to change or scale color brightness. The processor in some implementations may determine whether the difference is above a threshold level (208). If so, then the processor may determine that the face is too bright for the printing device and opt to decrease/reduce the brightness of the image (209). On the other hand, if the difference is below the threshold level (208), the processor may determine that the face is too dark for the printing device and opt to increase/amplify the brightness of the image (210).

Changing image brightness can be implemented in many ways. In one example, the processor of some implementations may subtract or add a value from the brightness component to decrease or increase the brightness. Some implementations may use the brightness difference calculated in step 205 to adaptively calculate a value for brightness adjustment for each individual image. In this manner, if the difference is larger in one case, then a bigger adjustment value is applied, in this particular case, to the brightness normalization process.

Figure 3:
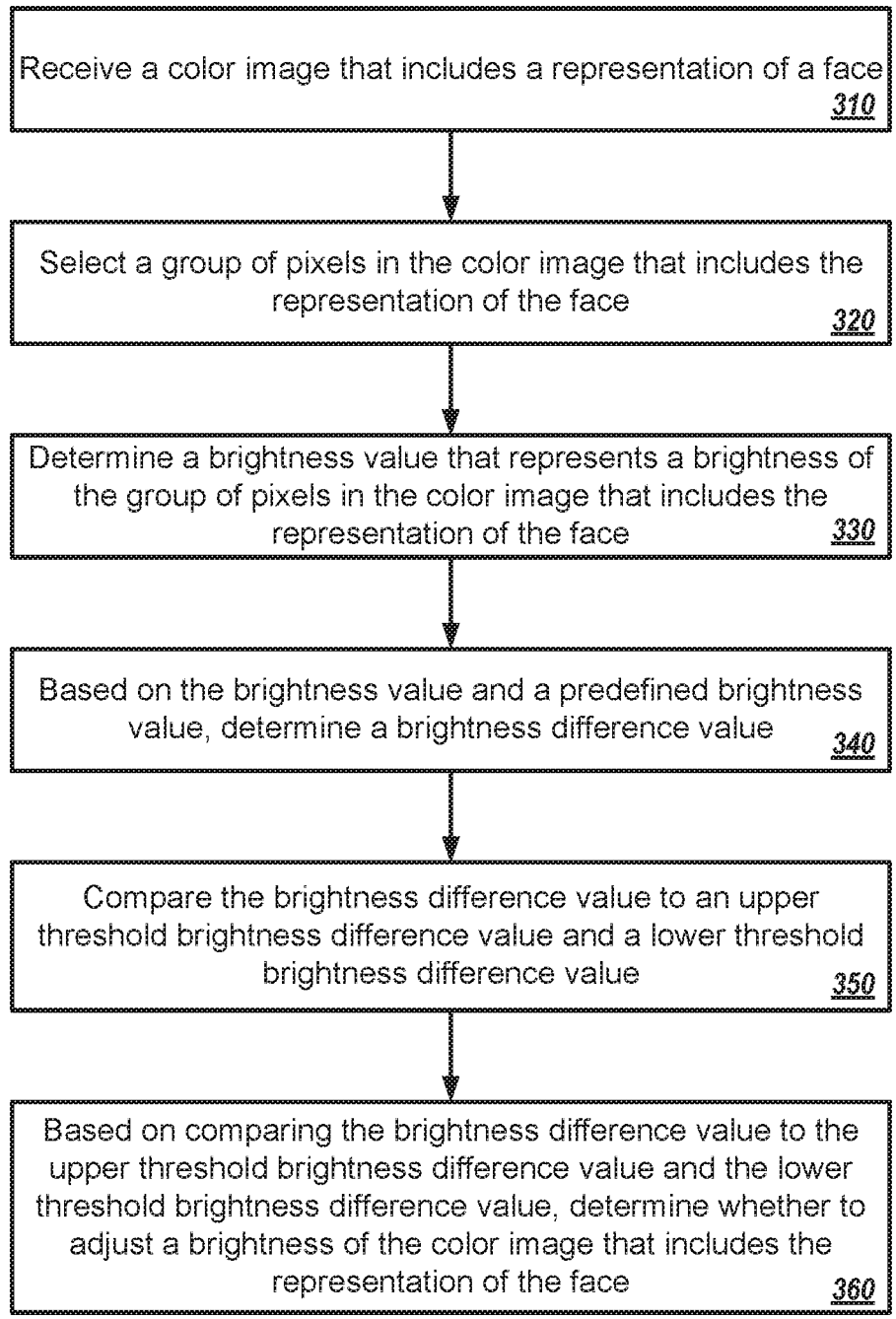
FIG. 3 is a flowchart of an example process for normalizing skin tone of a portrait image.

FIG. 3 is a flowchart of an example process 300 example process for normalizing skin tone of a portrait image. In general, the process 300 determine the brightness level of a portion of the portrait image. If the brightness level is within a predetermined range, then the process 300 makes no changes to the portrait image. If the brightness level if above or below the predetermined range, then the process 300 decreases or increases the brightness of the portrait image, respectively. The process 300 will be described as being performed by a computer system comprising one or more computers, for example, the system 100 of FIG. 1. Each of the components of system 100 may be included on a single computing device or distributed across multiple computing devices.

The system receives a color image that includes a representation of a face (310). The color image may be comprised of pixels that each includes a different value. The pixels may be defined using hue quantity, a saturation quantity, and a value quantity (HSV). The value quantity may be related to the brightness of the pixel.

The system selects a group of pixels in the color image that includes the representation of the face (320). In some implementations, the system selects a group of pixels of a predetermined size, such as a one hundred by one hundred square. In some implementations, the system selects a group of pixels that are a percentage of the pixels of the image, such as twenty percent. In some implementations, the system performs facial detection to determine the location of the face in the image. The system may ensure that the face in the image includes the group of pixels.

The system determines a brightness value that represents a brightness of the group of pixels in the color image that includes the representation of the face (330). In some implementations, the system determines the brightness value as the arithmetic mean of the value quantity of the group of pixels. In some implementations, the system determines the brightness value as the geometric mean of the value quantity of the group of pixels. In some implementations, the system determines the brightness value as the median of the value quantity of the group of pixels.

The system, based on the brightness value and a predefined brightness value, determines a brightness difference value (340). In some implementations, the predefined brightness value is based on how the system will use the image. For example, the system may provide the image to a printer that prints identification documents. The printer may have a predefined brightness value to ensure a high quality image on the identification document. Other uses may have different predefined brightness values. In some implementations, the system computes a difference between the brightness value and a predefined brightness value to generate the brightness difference value. In some implementations, the system computes a ratio or quotient of the brightness value and the predefined brightness value or a ratio or quotient of the predefined brightness value and the brightness value to generate the brightness difference value.

The system compares the brightness difference value to an upper threshold brightness difference value and a lower threshold brightness difference value (350). In some implementations, the brightness difference value is greater than the upper threshold brightness difference value. In some implementations, the brightness difference value is less than the lower threshold brightness difference value. In some implementations, the brightness difference value is between the upper and lower threshold brightness difference values.

The system, based on comparing the brightness difference value to the upper threshold brightness difference value and the lower threshold brightness difference value, determines whether to adjust a brightness of the color image that includes the representation of the face (360). If the brightness difference value is greater than the upper threshold brightness difference value, then the image is too bright. In some implementations, the system may decrease the value quantity of each pixel in the image by a fixed amount. In some implementations, the system decreases the value quantity of each pixel by an amount that is based on the brightness difference value.

If the brightness difference value is less than the lower threshold brightness difference value, then the image is not bright enough. In some implementations, the system may increase the value quantity of each pixel in the image by a fixed amount. In some implementations, the system increases the value quantity of each pixel by an amount that is based on the brightness difference value.

In some implementations, the system leaves the image unchanged if the brightness difference value is between the upper and lower threshold brightness difference values. In some implementations, the system performs the process 300 again on the image after adjusting the brightness to ensure that the brightness of the adjusted image is correct.

The system may provide the adjusted image to a printer or other device for inclusion in an identification document. The identification document may be broadly defined to include, for example, credit cards, bank cards, phone cards, passports, driver's licenses, network access cards, employee badges, debit cards, security cards, visas, immigration documentation, national ID cards, citizenship cards, permanent resident cards (e.g., green cards), Medicare cards, Medicaid cards, social security cards, security badges, certificates, identification cards or documents, voter registration cards, police ID cards, border crossing cards, legal instruments, security clearance badges and cards, gun permits, gift certificates or cards, membership cards or badges, etc.

Figure 4:
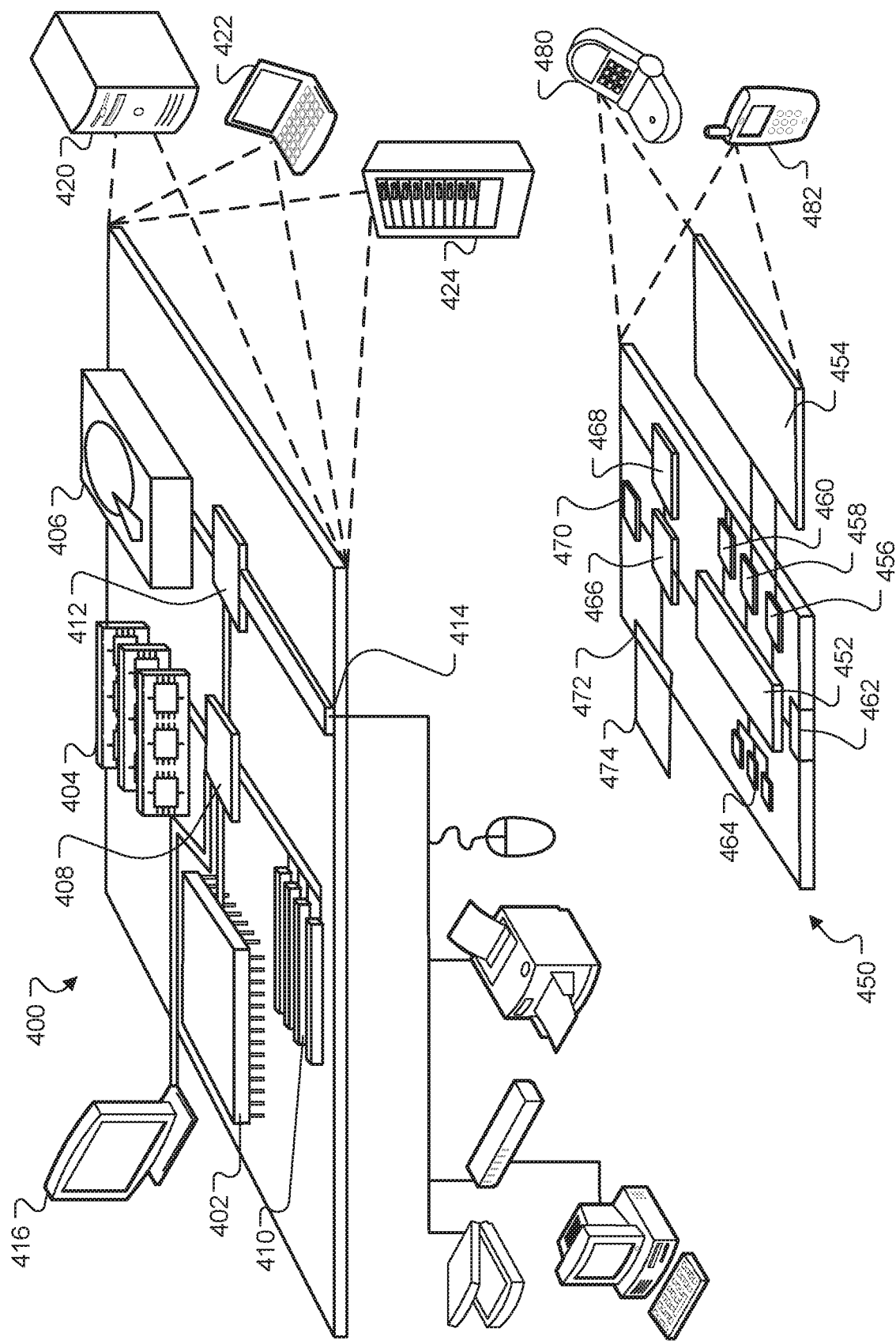
FIG. 4 is an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
   receiving, by a computing device, a color image that includes a representation of a face;
   selecting, by the computing device, a group of pixels in the color image that includes the representation of the face;
   determining, by the computing device, a brightness value that represents a brightness of the group of pixels in the color image that includes the representation of the face;
   based on the brightness value and a predefined brightness value, determining, by the computing device, a brightness difference value;
   referencing a dynamic range for a printing device;
   comparing, and based upon referencing the dynamic range for the printing device, the brightness difference value to an upper threshold brightness difference value and a lower threshold brightness difference value; and
   based on comparing the brightness difference value to the upper threshold brightness difference value and the lower threshold brightness difference value, determining, by the computing device, whether to adjust a brightness of the color image that includes the representation of the face.

2. The method of claim 1, wherein:
   each pixel of the color image is defined by a hue quantity, a saturation quantity, and a value quantity, and
   determining a brightness value the represents a brightness of the group of pixels in the color image that includes the representation of the face by determining an average of the value quantities for pixels in the group of pixels.

3. The method of claim 1, comprising:
   based on comparing the brightness difference value to the upper threshold brightness difference value and the lower threshold brightness difference value, determining, by the computing device, that the brightness difference value is greater than the upper threshold brightness difference value; and
   determining whether to adjust a brightness of the color image that includes the representation of the face by determining to decrease the brightness of the color image that includes the representation of the face.

4. The method of claim 3, comprising:
   decreasing the brightness of the color image that includes the representation of the face by subtracting a predetermined value from the value quantity of each pixel of the color image that includes the representation of the face.

5. The method of claim 3, comprising:
   decreasing the brightness of the color image that includes the representation of the face by subtracting a value from the value quantity of each pixel of the color image that includes the representation of the face based on the brightness difference value.

6. The method of claim 1, comprising:
   based on comparing the brightness difference value to the upper threshold brightness difference value and the lower threshold brightness difference value, determining, by the computing device, that the brightness difference value is less than the lower threshold brightness difference value; and
   determining whether to adjust a brightness of the color image that includes the representation of the face by determining to increase the brightness of the color image that includes the representation of the face.

7. The method of claim 6, comprising:
   decreasing the brightness of the color image that includes the representation of the face by adding a predetermined value to the value quantity of each pixel of the color image that includes the representation of the face.

8. The method of claim 6, comprising:
   decreasing the brightness of the color image that includes the representation of the face by adding a value to the value quantity of each pixel of the color image that includes the representation of the face based on the brightness difference value.

9. The method of claim 1, comprising:
   based on comparing the brightness difference value to the upper threshold brightness difference value and the lower threshold brightness difference value, determining, by the computing device, that the brightness difference value is between the upper threshold brightness difference value and the lower threshold brightness difference value; and determining whether to adjust a brightness of the color image that includes the representation of the face by maintaining the brightness of the color image that includes the representation of the face.

10. The method of claim 1, wherein the predefined brightness value is based on a type of device to which the computing device provides the adjusted color image.

11. A system comprising:
one or more computers; and
one or more storage devices storing instructions that are operable, when executed by the one or more computers, to cause the one or more computers to perform operations comprising:
receiving, by a computing device, a color image that includes a representation of a face;
selecting, by the computing device, a group of pixels in the color image that includes the representation of the face;
determining, by the computing device, a brightness value that represents a brightness of the group of pixels in the color image that includes the representation of the face;
based on the brightness value and a predefined brightness value, determining, by the computing device, a brightness difference value;
referencing a dynamic range for a printing device;
comparing, and based upon referencing the dynamic range for the printing device, the brightness difference value to an upper threshold brightness difference value and a lower threshold brightness difference value; and
based on comparing the brightness difference value to the upper threshold brightness difference value and the lower threshold brightness difference value, determining, by the computing device, whether to adjust a brightness of the color image that includes the representation of the face.

12. The system of claim 11, wherein:
each pixel of the color image is defined by a hue quantity, a saturation quantity, and a value quantity, and
determining a brightness value the represents a brightness of the group of pixels in the color image that includes the representation of the face by determining an average of the value quantities for pixels in the group of pixels.

13. The system of claim 11, wherein the operations comprise:
based on comparing the brightness difference value to the upper threshold brightness difference value and the lower threshold brightness difference value, determining, by the computing device, that the brightness difference value is greater than the upper threshold brightness difference value; and
determining whether to adjust a brightness of the color image that includes the representation of the face by determining to decrease the brightness of the color image that includes the representation of the face.

14. The system of claim 13, wherein the operations comprise:
decreasing the brightness of the color image that includes the representation of the face by subtracting a predetermined value from the value quantity of each pixel of the color image that includes the representation of the face.

15. The system of claim 13, wherein the operations comprise:
decreasing the brightness of the color image that includes the representation of the face by subtracting a value from the value quantity of each pixel of the color image that includes the representation of the face based on the brightness difference value.

16. The system of claim 11, wherein the operations comprise:
based on comparing the brightness difference value to the upper threshold brightness difference value and the lower threshold brightness difference value, determining, by the computing device, that the brightness difference value is less than the lower threshold brightness difference value; and
determining whether to adjust a brightness of the color image that includes the representation of the face by determining to increase the brightness of the color image that includes the representation of the face.

17. The system of claim 16, wherein the operations comprise:
decreasing the brightness of the color image that includes the representation of the face by adding a predetermined value to the value quantity of each pixel of the color image that includes the representation of the face.

18. The system of claim 11, wherein the operations comprise:
based on comparing the brightness difference value to the upper threshold brightness difference value and the lower threshold brightness difference value, determining, by the computing device, that the brightness difference value is between the upper threshold brightness difference value and the lower threshold brightness difference value; and
determining whether to adjust a brightness of the color image that includes the representation of the face by maintaining the brightness of the color image that includes the representation of the face.

19. The system of claim 11, wherein the predefined brightness value is based on a type of device to which the computing device provides the adjusted color image.

20. A non-transitory computer-readable medium storing software comprising instructions executable by one or more computers which, upon such execution, cause the one or more computers to perform operations comprising:
receiving, by a computing device, a color image that includes a representation of a face;
selecting, by the computing device, a group of pixels in the color image that includes the representation of the face;
determining, by the computing device, a brightness value that represents a brightness of the group of pixels in the color image that includes the representation of the face;
based on the brightness value and a predefined brightness value, determining, by the computing device, a brightness difference value;
referencing a dynamic range for a printing device;
comparing, and based upon referencing the dynamic range for the printing device, the brightness difference value to an upper threshold brightness difference value and a lower threshold brightness difference value; and
based on comparing the brightness difference value to the upper threshold brightness difference value and the lower threshold brightness difference value, determining, by the computing device, whether to adjust a brightness of the color image that includes the representation of the face.

* * * * *